United States Patent Office 3,594,416
Patented July 20, 1971

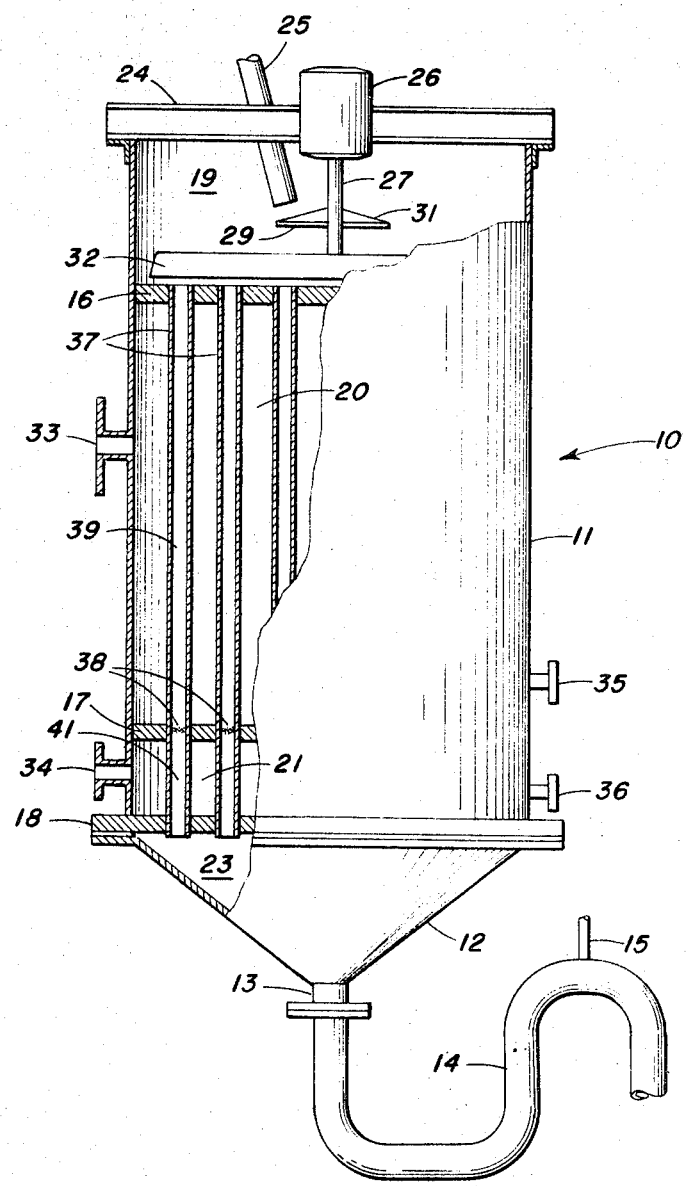

3,594,416
MELTING OF UREA CRYSTALS
Robert N. Summerville, Cranford, and Arthur M. Bauer, Tenafly, N.J., assignors to The Lummus Company, Bloomfield, N.J.
Filed Apr. 10, 1968, Ser. No. 720,156
Int. Cl. C07c *127/00*
U.S. Cl. 260—555
5 Claims

ABSTRACT OF THE DISCLOSURE

A process and apparatus for producing a urea melt wherein the urea is melted in a plurality of steam heated vertical tubes, while being maintained in equilibrium with solid urea, to produce a urea melt essentially at or slightly above the melting point of urea, approximately 271° F. The total residence time for the melting is maintained at less than 7 minutes whereby increase in biuret content during melting is minimized.

---

This invention relates to the production of urea and more particularly to the production of urea having a low biuret content. Still more particularly, this invention relates to a process and apparatus for producing a urea melt while minimizing the production of biuret.

In order to meet the increasing competition in the urea market, there is a continuing need for the production of urea having a very low biuret content; i.e., less than 0.3 weight percent. In general, low biuret urea is produced by crystallizing urea in the effluent from a urea production zone in an evaporative crystallizer, leaving substantially all of the biuret in the mother liquor, with a small portion of the mother liquor being recycled to the urea production zone to convert the biuret contained therein to urea.

The urea crystals, generally containing about 0.1 weight percent biuret, must then be melted to provide a feed for a prilling device and such melting is accompanied by an increase in the biuret content. Thus, in order to provide a final product having a biuret content less than 0.3 weight percent, the increase in biuret during such melting must be less than 0.2 weight percent. A number of procedures have been developed in an attempt to limit the increase in biuret during the urea melting. Thus, Dutch Pat. 88,554 of June 16, 1958 describes a process wherein an electric current is employed for melting the urea and U.S. Pat. No. 2,961,464 describes a process wherein the urea is melted while suspended in an inert oil. These processes, however, are not completely effective for limiting the increase of biuret and in addition, the former process is quite expensive while the latter process involves a difficult separation of urea melt from inert oil.

Accordingly, an object of this invention is to provide an improved process and apparatus for melting urea.

Another object of this invention is to provide a process and apparatus for melting urea wherein the increase of biuret is minimized.

A further object of this invention is to provide a process and apparatus which minimizes the costs for melting urea.

These and other objects of the invention should be apparent to those skilled in the art from the following description of the invention when read with reference to the accompanying drawing wherein:

The drawing is a partially open elevational view of an embodiment of the apparatus of the invention.

The objects of this invention are broadly accomplished by melting urea crystals while maintaining the melt in equilibrium with urea crystals so that the temperature of the melt is essentially at the melting point of urea, approximately 271° F. The maintenance of contact between the liquid and solid urea phases provides a heat transfer surface whereby the greatest part of the heat of fusion is transmitted to the urea crystals. In this manner, heating of the melt to a temperature substantially beyond the melting point of urea is prevented.

In order to effectively achieve the desired results of the invention; i.e., minimal increase in biuret content, the residence time for the melting should be less than about 7 minutes. In accordance with the invention, such low residence times are achieved by providing high heat transfer rates during the melting; i.e., in the order of about 50 to about 200 B.t.u./hr.-ft.$^2$-° F., with such high heat transfer rates generally being obtained by effecting the urea melting in an apparatus that provides a high ratio of heat transfer surface to volume, i.e., a ratio greater than about 10 ft.$^{-1}$, preferably within the range between about 10 and about 30 ft.$^{-1}$.

The invention will now be further described with reference to an embodiment of the apparatus of the invention which may be employed for melting urea with a minimal increase in biuret content. Referring now to the drawing, there is illustrated a vertical urea melting vessel 10 having a generally cylindrical upper portion 11 and a conically shaped lower portion 12, the apex of which is provided with a melt outlet 13. The melt outlet 13 is provided with a liquid seal leg 14 having a vent 15. The interior of the vessel is provided with an upper tube sheet 16, an intermediate tube sheet 17, and a lower tube sheet 18, all suitably mounted to the interior of the vessel 10, for example, by a weld, dividing the interior of the vessel 10 into an upper solid inlet chamber 19, two intermediate chambers 20 and 21, respectively, and a lower conically shaped melt collecting chamber 23.

The upper chamber 19 is closed by a circular cover 24 which is provided with a crystal feed inlet pipe 25 and a motor 26. A vertical shaft 27 driven by the motor 26 extends into the upper chamber 19 and has rigidly mounted thereon at an intermediate portion of the chamber 19, a horizontal distributing plate 29, provided with a plurality of radial vertical vanes 31, and a horizontal distributing rake or arm 32, positioned immediately above tube sheet 16. The inlet pipe 25 terminates above the distributing plate 27 so that crystals falling therefrom will be introduced onto the distributing plate 29.

The intermediate chambers 20 and 21 are provided with steam inlets 33 and 34, respectively, and condensate outlets 35 and 36, respectively. A plurality of vertical parallel tubes 37 are mounted on tube sheets 16, 17, and 18 and traverse the entire length of intermediate chambers 20 and 21 thereby placing upper chamber 19 in fluid flow communication with lower chamber 23. The dimensions of the tubes are chosen so as to provide a ratio of heat transfer surface to volume within the range hereinabove described. The interior of each of the tubes 37 is provided with a screen 38, positioned at the level of the tube sheet 17 thereby dividing the interior of the tubes 37 into an upper portion 39 coextensive with the intermediate chamber 20 and a lower portion 41 coextensive with the intermediate chamber 21.

In operation, urea crystals introduced through inlet pipe 25 fall onto the horizontal plate 29 and are thrown off the plate onto the tube sheet 16, in a more or less uniform pattern, by the velocity imparted thereto by the rotating vanes 31. Some of the crystals fall directly into the tubes 37 and the remainder are swept into the tubes by the rotating rake 32.

Steam at a suitable pressure, generally between about 50 and about 150 p.s.i.g., is introduced into the chamber 20 through inlet 33 and flows about the tubes 37. The urea crystals contacting the walls of the tubes 37 are indirectly heated by the steam in chamber 20, resulting in melting of such crystals and condensation of the steam. The steam condensate is withdrawn from chamber 20 through outlet 35.

The urea crystals which do not contact the walls of the tubes are retained on the screens 38 until melted and, therefore, most of the molten urea is in contact with urea in the solid phase, resulting in molten urea essentially at the melting point of urea, approximately 271° F.

The molten urea passes through the screens 38 into the lower portion 41 of the tubes 37 and is further heated by indirect heat transfer with steam introduced into chamber 21 through inlet 34. The pressure of the steam introduced into chamber 21 is controlled to achieve further heating of the melt to a temperature slightly above the melting point to prevent any crystallization thereof in the prilling device. Steam condensate is withdrawn from chamber 21 through outlet 36.

The molten urea flows from the lower portion 41 of the tubes 37 into the collecting chamber 23 and through the melt outlet 13. The melt flows through the seal leg 14 to a suitable prilling device (not shown), such as a prilling tower. The total elapsed time for effecting melting of the urea and introduction of the melted urea into the prilling device should be less than about 7 minutes. The seal leg 14 functions to prevent leakage of air into the bottom of tubes 37 which interfere with the flow of urea and the rapid heating effected therein.

The invention is further illustrated by the following example, but the scope of the invention is not to be limited thereby.

EXAMPLE

Solid urea having a biuret content of 0.08 weight percent is introduced into a tubular heat exchanger as hereinabove described with respect to the drawing. The tubes have a diameter of 2 inches and the length of the tubes in chamber 20 is 4 feet, providing a ratio of heat transfer surface to volume of 24 ft.$^{-1}$. The melted urea flows through the tubes at the rate of 2.36 lbs./min. and is maintained in equilibrium with solid urea whereby the temperature of the urea melt is about 271° F. The urea is melted by indirect heat transfer with steam at a temperature of 324° F. and a pressure of 80 p.s.i.g., introduced into chamber 20 at a rate of 0.5 lb./min.

Urea melt is withdrawn at a temperature of 273° F. and has a biuret content of 0.17 weight percent.

Although the use of a tube and shell type of melter is preferred, it is to be understood that the urea melting may be effected in other devices. Thus, for example, the urea may be melted between parallel steam heated plates, in the manner hereinabove described. Similarly, the urea may be melted on the outside of vertical tubes, either plain or finned, although such a device would be more expensive than the hereinabove described preferred device.

As a further modification, the tube sheet 17, inlet 34, outlet 36 and chamber 21 may be omitted with the screens 38 being positioned at the level of the tube sheet 18. The urea melt may be heated, for example, in conduit 14 to a temperature slightly above the melting point to prevent crystallization in the prilling device.

The process and apparatus of the invention are extremely effective for melting urea, with the biuret content increase generally being limited to less than 0.2 weight percent. In addition, the apparatus employed is compact, relatively inexpensive and provides a constant melting rate at constant steam pressure. Furthermore, crystal distribution problems are minimized and excellent temperature control is possible due to the ability to provide different steam pressures for melting and superheating the urea. The invention may be employed in large urea plants in the order of 1000 tons per day.

Numerous modifications and variations of the present invention are possible in light of the above teachings and, therefore, within the scope of the appended claims, the invention may be practiced otherwise than as particularly described.

What is claimed is:

1. A process for melting urea while minimizing the increase in biuret content, comprising:

passing a feed consisting essentially of solid urea by gravity flow through a vertically positioned passage; heating the solid urea by indirect heat transfer while said urea is being passed by gravity through said passage to effect melting thereof; retaining solid urea in the vertical passage while said urea being heated by the indirect heat transfer to maintain the urea melt produced in said vertical passage in equilibrium with said solid urea, thereby producing a urea melt essentially at the urea melting point; and withdrawing only molten urea from the vertical passage.

2. The process as defined in claim 1 and further comprising withdrawing the melt from the vertical passage; and introducing the melt into a prilling zone, the total time for melting of the urea crystals and introduction of the urea into the prilling zone being less than about 7 minutes.

3. The process as defined in claim 1 wherein said heating is effected by indirect heat transfer with steam.

4. The process as defined in claim 1 wherein the ratio of the heat transfer surface to the volume of said passage ranges from about 10 to about 30 ft.$^{-1}$.

5. The process defined by claim 4 wherein the melting is effected by indirect heat transfer at a heat transfer rate between about 50 and about 200 B.t.u./hr-ft.$^2$-° F.

References Cited

UNITED STATES PATENTS 3,025,571   3/1962   Beecher et al. _____ 260—555X

FOREIGN PATENTS 6403782   10/1965   Netherlands.
368,025   5/1961   Japan _____ 260—555
826,815   1/1960   Great Britain _____ 260—555

JOHN D. RANDOLPH, Primary Examiner

M. W. GLYNN, Assistant Examiner

U.S. Cl. X.R.

23—280, 308